(12) United States Patent
Yamamoto et al.

(10) Patent No.: US 6,836,932 B2
(45) Date of Patent: Jan. 4, 2005

(54) ASSIST GRIP

(75) Inventors: Yasuo Yamamoto, Utsunomiya (JP); Tamotsu Sugiyama, Ota (JP)

(73) Assignee: Nifco Inc., Yokohama (JP)

( * ) Notice: Subject to any disclaimer, the term of this patent is extended or adjusted under 35 U.S.C. 154(b) by 19 days.

(21) Appl. No.: 10/322,499

(22) Filed: Dec. 19, 2002

(65) Prior Publication Data

US 2003/0126718 A1 Jul. 10, 2003

(30) Foreign Application Priority Data

Jan. 9, 2002 (JP) ........................................ 2002-002259

(51) Int. Cl.[7] .............................................. E05B 1/00
(52) U.S. Cl. ........................................................ 16/110.1
(58) Field of Search ............................ 16/110.1, 111.1, 16/114.1, 429, 412, 444, 445, 438, DIG. 24, 50, 85; 296/214, 210, 39.1; 411/45–48, 41

(56) References Cited

U.S. PATENT DOCUMENTS

| | | | | |
|---|---|---|---|---|
| 2,282,412 A | * | 5/1942 | Wallace | 16/436 |
| 4,981,322 A | * | 1/1991 | Dowd et al. | 296/214 |
| 4,981,323 A | * | 1/1991 | Dowd et al. | 296/214 |
| 5,403,064 A | * | 4/1995 | Mahler et al. | 296/214 |
| 5,560,575 A | * | 10/1996 | Krysiak | 248/222.12 |
| 5,567,098 A | * | 10/1996 | Gordon | 411/48 |
| 5,920,957 A | * | 7/1999 | Wagner | 16/408 |
| 6,048,125 A | * | 4/2000 | Droche et al. | 403/12 |
| 6,176,660 B1 | * | 1/2001 | Lewis et al. | 411/45 |
| 6,322,126 B1 | * | 11/2001 | Kraus | 296/97.9 |
| 6,419,307 B1 | * | 7/2002 | Maruyama et al. | 296/214 |
| 6,428,089 B1 | * | 8/2002 | Noda | 296/214 |
| 6,477,739 B2 | * | 11/2002 | Miho et al. | 16/429 |
| 6,616,222 B1 | * | 9/2003 | Ponceau | 296/214 |
| 6,749,236 B2 | * | 6/2004 | Nomura et al. | 292/336.3 |
| 2002/0020250 A1 | * | 2/2002 | Sakuma et al. | 74/551.9 |

FOREIGN PATENT DOCUMENTS

JP 10-044853 * 2/1998

* cited by examiner

Primary Examiner—Robert J. Sandy
Assistant Examiner—Andre' L. Jackson
(74) Attorney, Agent, or Firm—Manabu Kanesaka

(57) ABSTRACT

A grip main portion includes supporting members disposed on both sides thereof. An assist grip can be rotated to switch between a non-operational position and an operational position projected into a compartment through the supporting members. An attaching portion of the compartment is provided with the first and second temporary attaching holes. One of the supporting members is provided with a pole protrusion passing freely through the first temporary attaching hole. The other supporting member is provided with an elastic protrusion to be engaged when inserted into the second temporary attaching hole. The elastic protrusion can be pulled out from the second temporary attaching hole when the grip main portion is rotated by a predetermined angle with the pole protrusion being pulled out from the first temporary attaching hole.

8 Claims, 10 Drawing Sheets

ASSIST GRIP

BACKGROUND OF THE INVENTION AND RELATED ART STATEMENT

The present invention relates to an assist grip installed in a vehicle, especially to an assist grip that can rotate to switch between non-operational and operational positions.

An example of a conventional assist grip has been disclosed in Japanese Patent Publication (KOKAI) No. 09-156409, as shown in FIGS. 10(a) and 10(b). In an assist grip 50, a main body 51 includes supporting members 52 assembled on both, sides. By means of the supporting members 52, the assist grip 50 can rotate to switch positions between a non-operational position retracted along an attachment portion inside a vehicle and an operational position projecting inside the vehicle. As shown in FIG. 10(b), each of the supporting members 52 is integrally formed of a recessed base portion 53, a through hole 54 provided at a back wall of the base portion 53, a protrusion 55 for temporary assembly, and a connection portion 56 provided under the base portion 53. The supporting members 52 are placed in recessed portions provided on both sides of the main unit 51, and are assembled to be rotatable through axes 57 (an urging device etc.)

Also, at the attaching portion of the vehicle (not shown), two temporary attaching holes corresponding to the protrusions 55 in each of the supporting members 52 and two screw holes (weld nut etc.) for engaging the screws 58 passing through screw holes 54 are installed beforehand. The protrusion 55 in each of the supporting members 52 is inserted into the temporary attaching hole to place the assist grip 50 in a specific position. Then, in a state that the grip 51 is switched to the operational position against the urging device, the assist grip 50 is attached with a predetermined strength by tightening the screw 58 to the screw hole 54. A reference numeral 59 indicates a hook for hooking a hanger and so on.

As described above, the assist grip 50 can rotate to switch between the non-operational position and the operational position, and is excellent in terms of safety and quality. However, the assist grip includes the following problems.

(1) In an operation of installing the grip inside the vehicle, for example, after a plurality of the assist grips 50 is fixed temporarily as being placed in specific positions, the grip is installed by tightening the screws 58 and so on. In the conventional structure, the pole-like protrusion 55 is inserted into the temporary attaching hole to fix temporarily. However, the protrusion 58 may easily come out from the temporary attaching hole when the grip is installed with the permanent attaching member such as the screw 58 etc., or when fixed by the screw 58, etc., even though an external diameter of the protrusion 55 is enlarged and pushed in the temporary attaching hole tightly.

To prevent this problem, as disclosed in Japanese Patent Publication (KOKAI) No. 2001-277926 or No. 2001-180359, instead of the supporting member, the following structure has been proposed. The structure includes a female member (a base member or a grommet with a temporary attaching function) having a locking pawl that contracts in a process of inserting into the attaching hole provided at the vehicle attaching portion, and a male member (a pin member or a pin with a permanent attaching function) to be pushed in the female member to make the locking pawl unable to reduce the diameter. However, in this structure, a manufacturing cost may be high due to the complicated structure, and the assist grip is difficult to remove from the attaching portion in the compartment of the vehicle during maintenance or for recovery upon scrapping the vehicle, and so on.

(2) The supporting member 52 is placed in the recessed portion provided on both sides of the grip main body 51. When the grip main body 51 is switched from the non-operational position shown in FIG. 10(a) to the operational position (a front side), the base portion 53 is exposed widely, and the inside of the recessed portion and a head of the screw 58 become visible. Therefore, the appearance of the assist grip becomes bad in the operational position and gives an unpleasant feeling, or the credibility of the merchandise itself is deteriorated.

An object of the invention is to solve the above-mentioned problems, and the first object is to provide an assist grip that is able to eliminate the problem of detaching easily in the temporarily assembled state, while maintaining an easy operation of temporarily installing to the attaching portion of the vehicle part, and also is easy to take off during the maintenance or the recovery upon scrapping the vehicle.

The second object is to provide an assist grip as stated above, wherein the assist grip maintains a good appearance without increasing the number of parts.

Further objects and advantages of the invention will be apparent from the following description of the invention.

SUMMARY OF THE INVENTION

In order to achieve the above-mentioned objects, the first aspect of the invention provides an assist grip having supporting members on both sides of a main portion of the grip. The assist grip can rotate to switch between a non-operational position retracted along an attaching portion of a vehicle and an operational position projecting inside the vehicle through the supporting members. After the supporting members are attached temporarily in the attaching portion of the vehicle, a permanent fixing member fixes the assist grip to the attaching portion. The attaching portion of the vehicle includes two holes with different shapes, namely the first temporary attaching hole and the second temporary attaching hole, at positions corresponding to the supporting members. One of the supporting members includes a pole protrusion for freely inserting and pulling out of the first temporary attaching hole. The other of the supporting members includes an elastic protrusion that can not be pulled out once inserted in the second temporary attaching hole with a specific pressure. When the grip main portion is rotated by a specific angle while the pole protrusion of the one supporting member is pulled out from the first temporary attaching hole, the elastic protrusion can be pulled out freely from the second temporary attaching hole.

According to the second aspect of the invention, in addition to the same structural features of the assist grip as those in the first aspect, the supporting members are integrally formed of a recessed base portion abutting against the attaching portion of the vehicle, and having a through hole for the permanent attaching member and a protrusion for temporary attaching; a cover portion connected to the base portion through a thin-wall hinge for opening and closing the recessed base portion; a locking device for locking and releasing the cover portion relative to the base portion; and a connection portion for attaching the supporting members to the grip main portion through an axis.

In the above-mentioned first aspect of the invention, the assist grip is designed from a view of a temporary attaching structure, and is attached temporarily by pushing toward the attaching portion of the vehicle from the front. Thus, once attached temporarily, the assist grip never come out due to the engagement between the elastic protrusion and the second temporary attaching hole, even if the assist grip receives a large vibration, etc. Also, when the assist grip needs to be taken off, the elastic protrusion of the other supporting member can be easily taken off from the second temporary attaching hole after the pole protrusion in the one of the supporting member is pulled out from the first temporary attaching hole and the grip main portion is rotated by a predetermined angle.

This is an advantage, for example, for a vehicle interior assembly line to conduct two separate processes, i.e. a temporary attaching process of attaching several assist grips to the corresponding positions inside the vehicle, and a permanent attaching process of fixing the grips by the permanent attaching members. Furthermore, it is relatively easy to remove the grips during the maintenance or recovery upon scrapping the motor vehicle.

The invention also provides modifications of the shapes of the first temporary attaching hole, the second temporary attaching hole, the pole protrusion and the elastic protrusion. However, the invention is not limited to the modifications, and can achieve the objects as long as the following features are met. The pole protrusion can be inserted and pulled out freely from the first temporary attaching hole. The elastic protrusion becomes incapable of being pulled out from the second temporary attaching hole when pushed in the second temporary attaching hole, and at the same time, the elastic protrusion can be pulled out easily from the second temporary attaching hole when the grip main portion is rotated by a predetermined angle.

The second aspect of the invention provides the assist grip from a viewpoint of the whole structure of the supporting member. The assist grip has the following structural and operational features. The supporting member is integrally formed of the cover portion for opening and closing and the engagement device. After the supporting member is tightened with the permanent attaching members (screw, bolt, etc.), the recessed portion of the base portion is covered with the cover portion. Thus, the good appearance and reliability are maintained, thereby increasing a commercial value without increasing the number of the parts.

Also, the third aspect of the invention provides modifications of the protrusion for the temporary attaching and the engagement device. The protrusion is designed, for example, to maintain the appearance feature by controlling the size of the recessed portion of the base portion, and to give a stable attachment by increasing an area abutting against the attaching portion of the vehicle. The engagement device is designed, for example, to install easily without spoiling the appearance.

DETAILED DESCRIPTION OF PREFERRED EMBODIMENTS

Figure 1A:
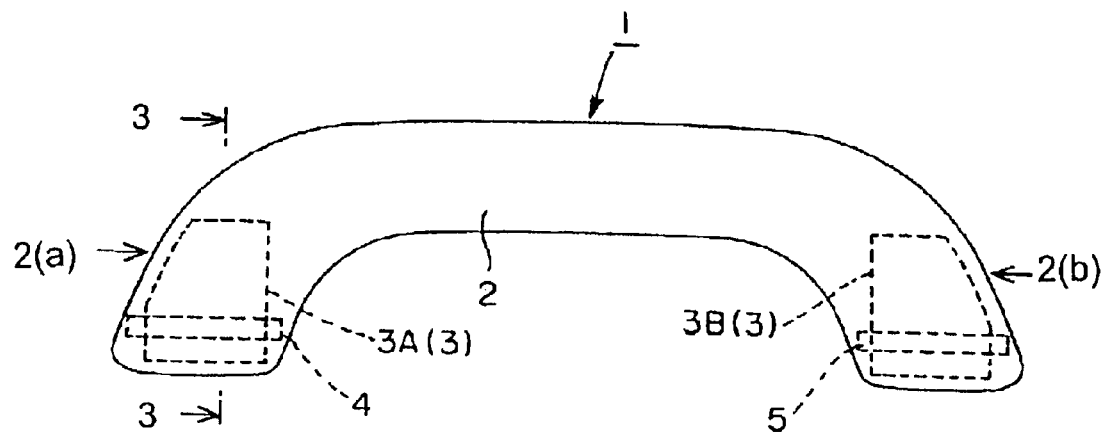
FIGS. 1(a) and 1(b) are front and rear views showing an assist grip of an embodiment according to the present invention.
Figure 1B:
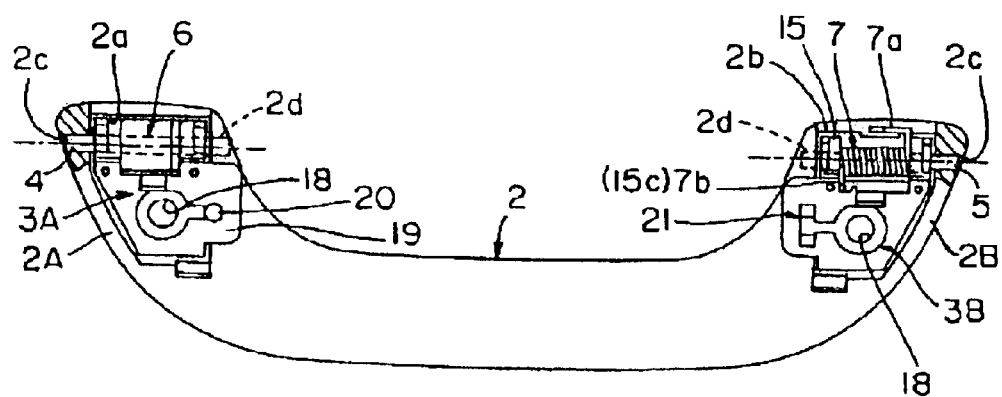
Figure 2A:
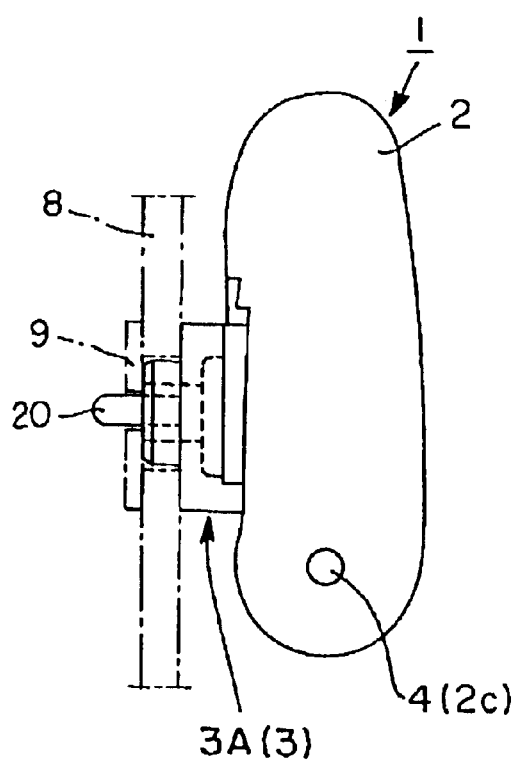
FIGS. 2(a) and 2(b) are side views of the assist grip seen from directions 2(a) and 2(b) in FIG. 1(a)
Figure 2B:
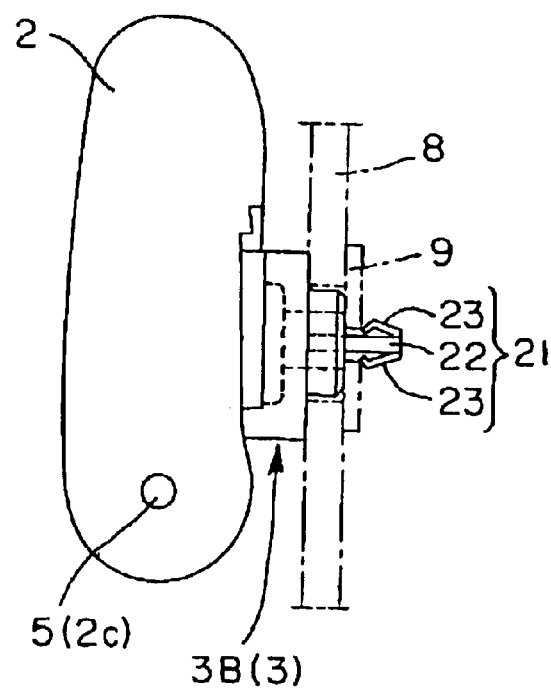
Figure 3:
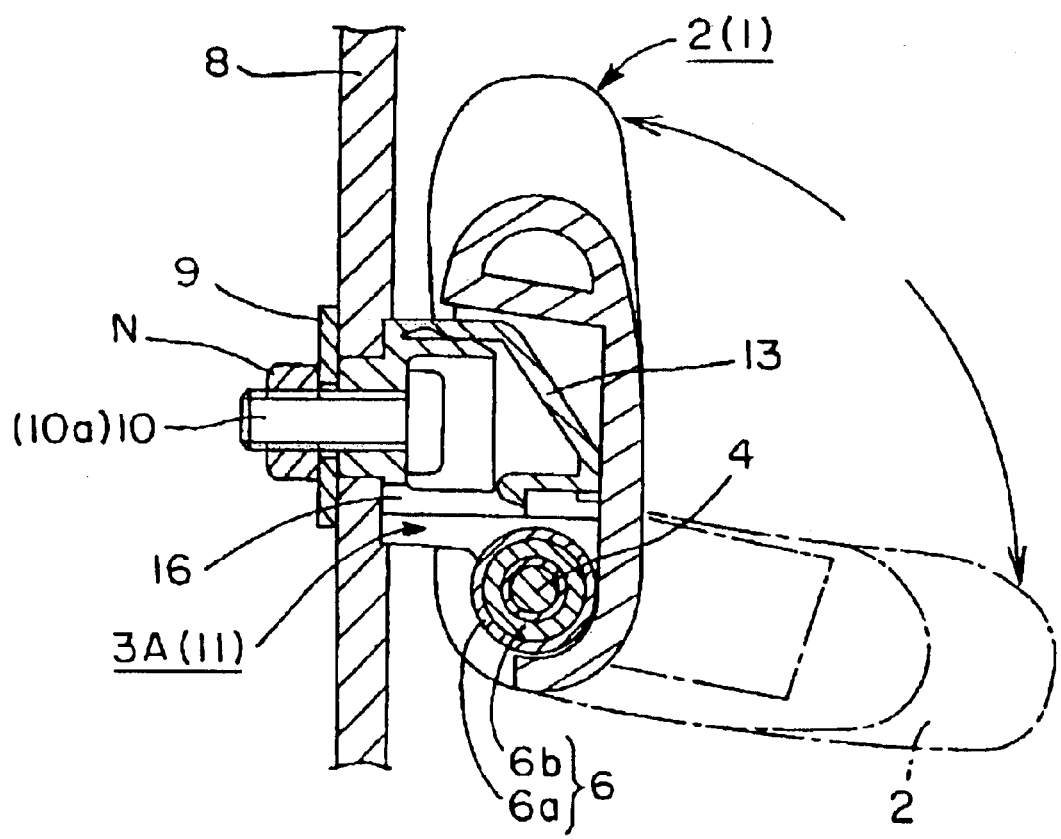
FIG. 3 is a sectional view taken along line 3—3 in FIG. 1(a) showing the assist grip in an installed state.
Figure 4A:
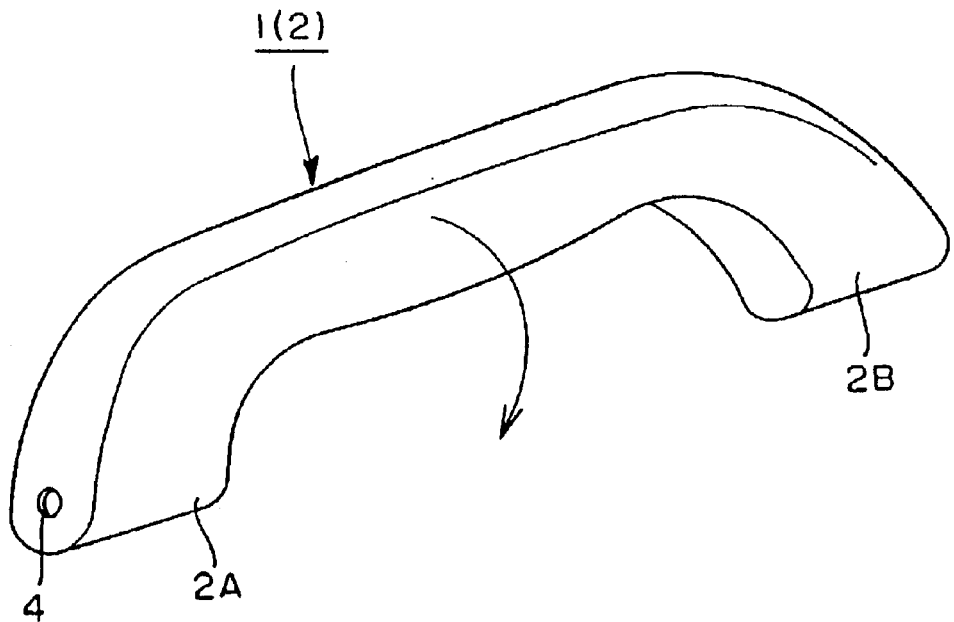
FIGS. 4(a) and 4(b) are perspective views showing non-operational and operational positions of the assist grip.
Figure 4B:
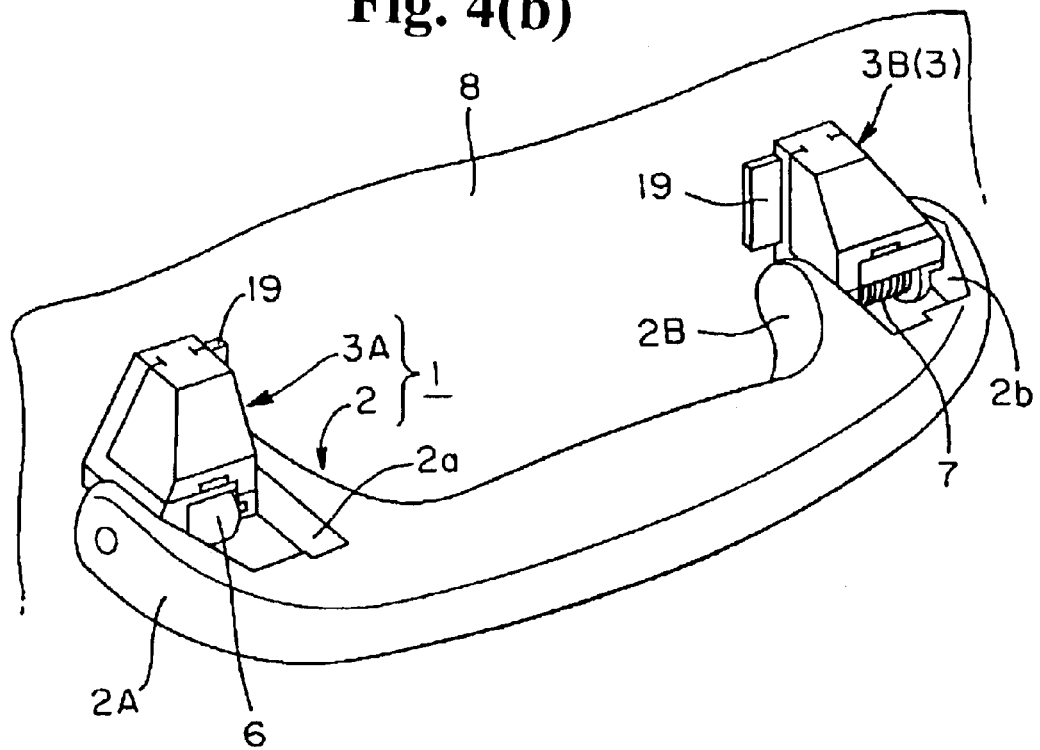
Figure 5A:
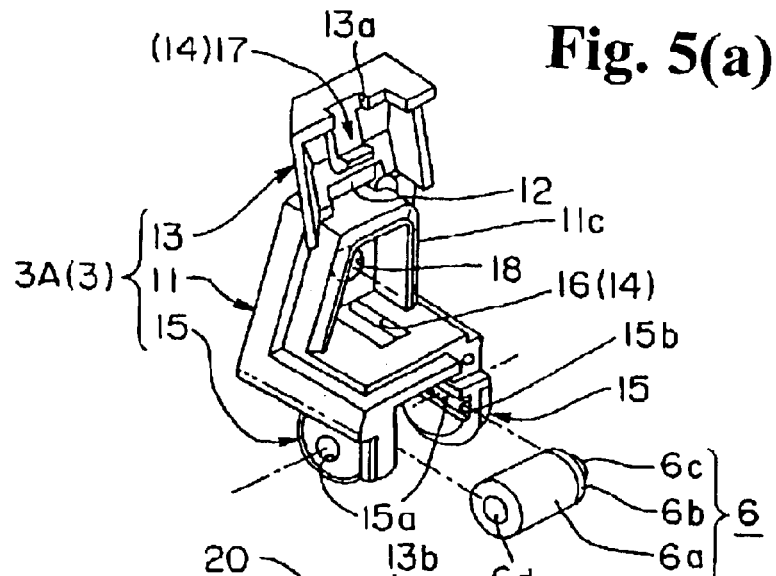
FIGS. 5(a)–5(c) are views showing essential parts in one end of the assist grip.
Figure 5B:
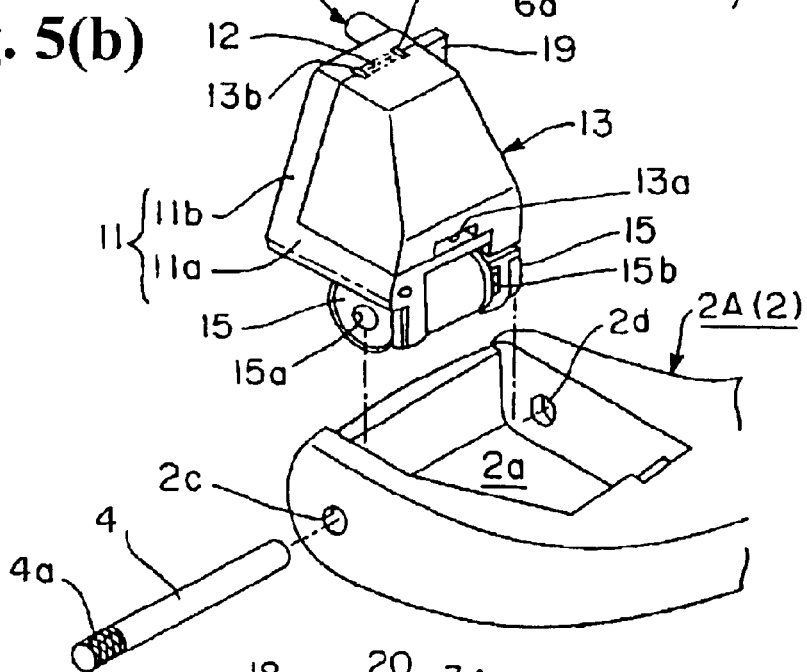
Figure 5C:
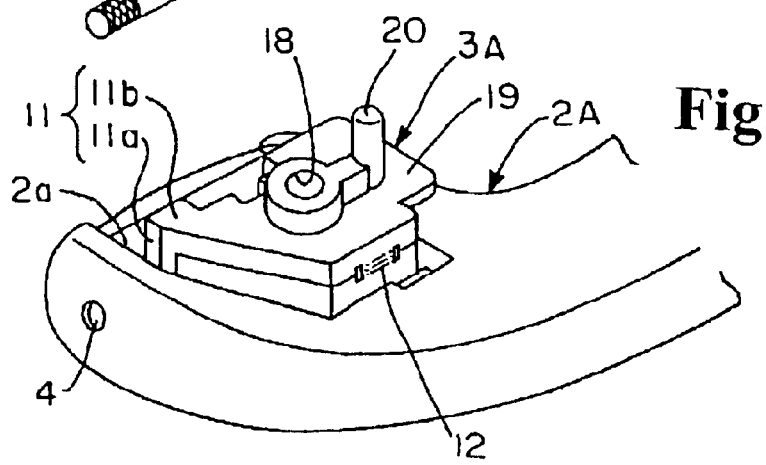

Hereunder, embodiments of the invention will be explained according to the accompanying drawings. FIGS. 1(a) and 1(b) show an embodiment of the assist grip, and FIG. 1(a) shows a frontal view, and FIG. 1(b) shows a rear view with a partial sectional view. FIGS. 2(a) and 2(b) are right and left side views showing the assist grip seen from directions 2(a) and 2(b) in FIG. 1(a). FIG. 3 is a sectional view along line 3—3 in FIG. 1(a) showing the assist grip in an installed state. FIGS. 4(a) and 4(b) are perspective views showing an appearance of the assist grip in a non-operational position (state) and an operational position (state). FIGS. 5(a)–5(c) are views showing a detailed structure of one end of the assist grip, wherein FIG. 5(a) is a view showing a supporting member in an open state of the cover portion, FIG. 5(b) is a view showing a relation between a main portion of the assist grip and the supporting member, and FIG. 5(c) is a view showing a state that the supporting member is installed to the main portion of the assist grip.

Figure 6A:
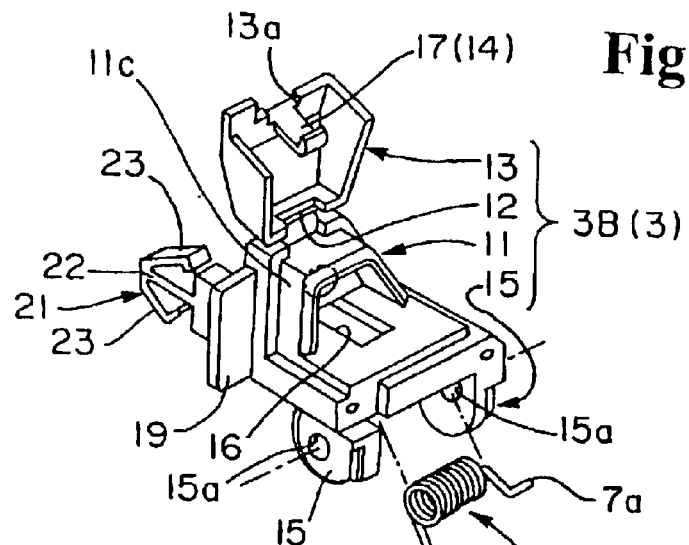
FIGS. 6(a)–6(c) are views showing essential parts in the other end of the assist grip.
Figure 6B:
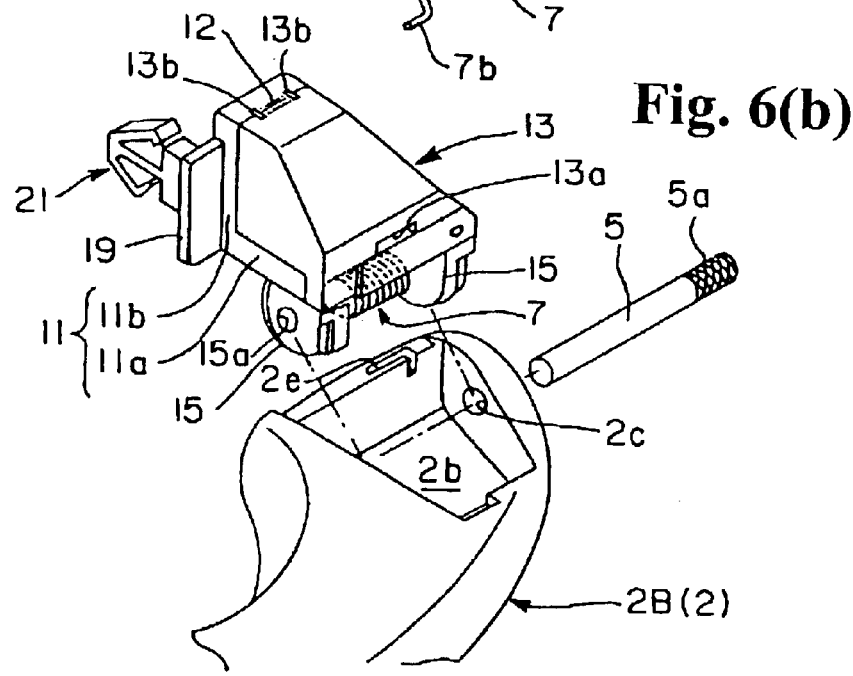
Figure 6C:
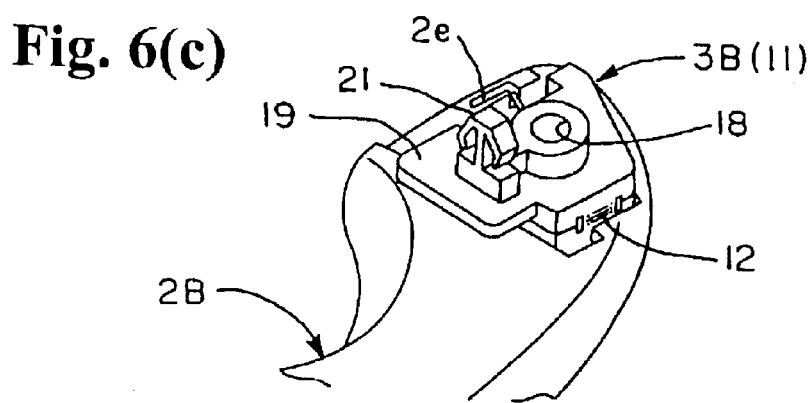
Figure 7:
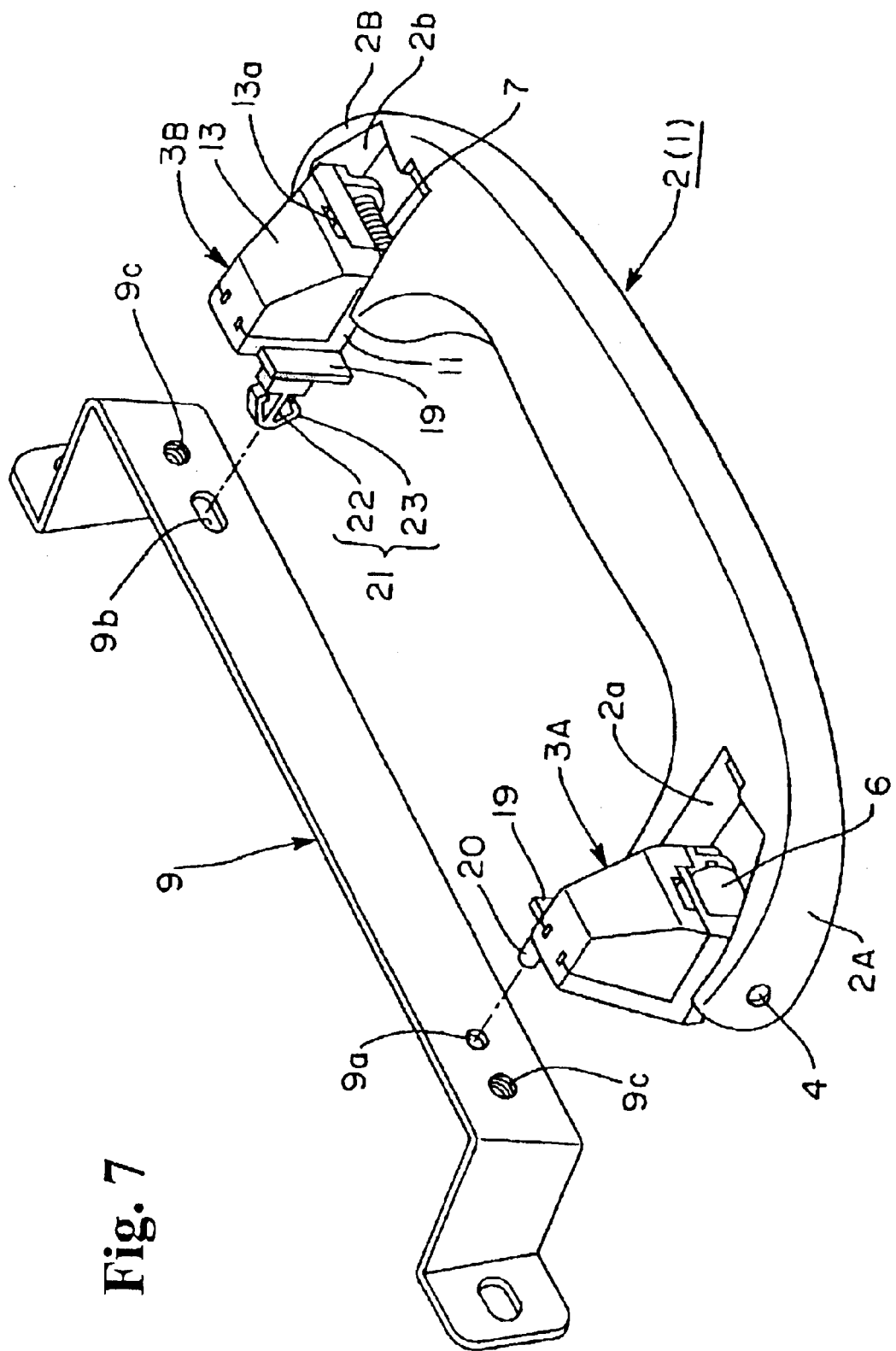
FIG. 7 is a perspective view showing an operation of temporary attaching of the assist grip.
Figure 8:
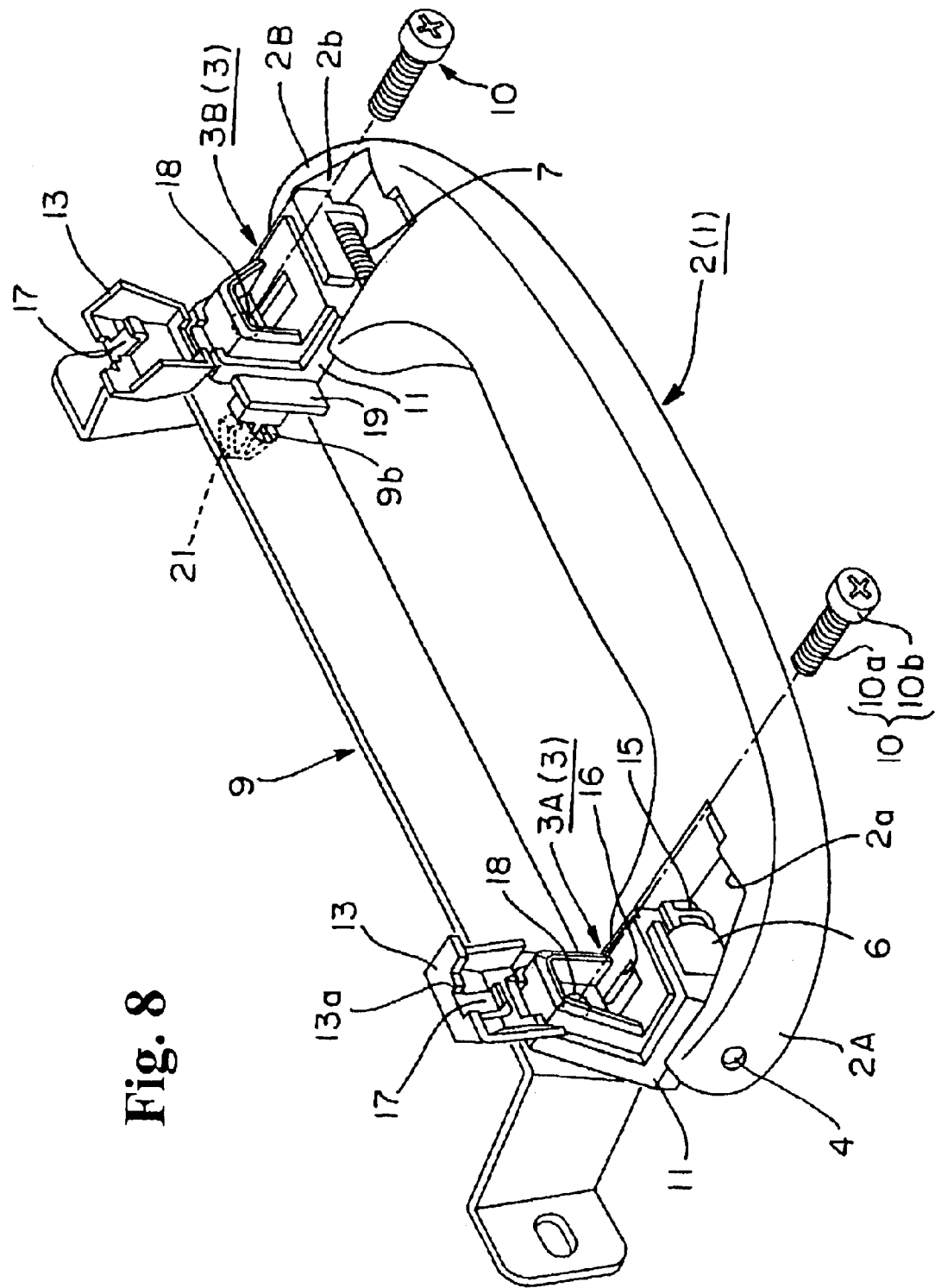
FIG. 8 is a perspective view showing an operation of permanent attaching of the assist grip.
Figure 9A:
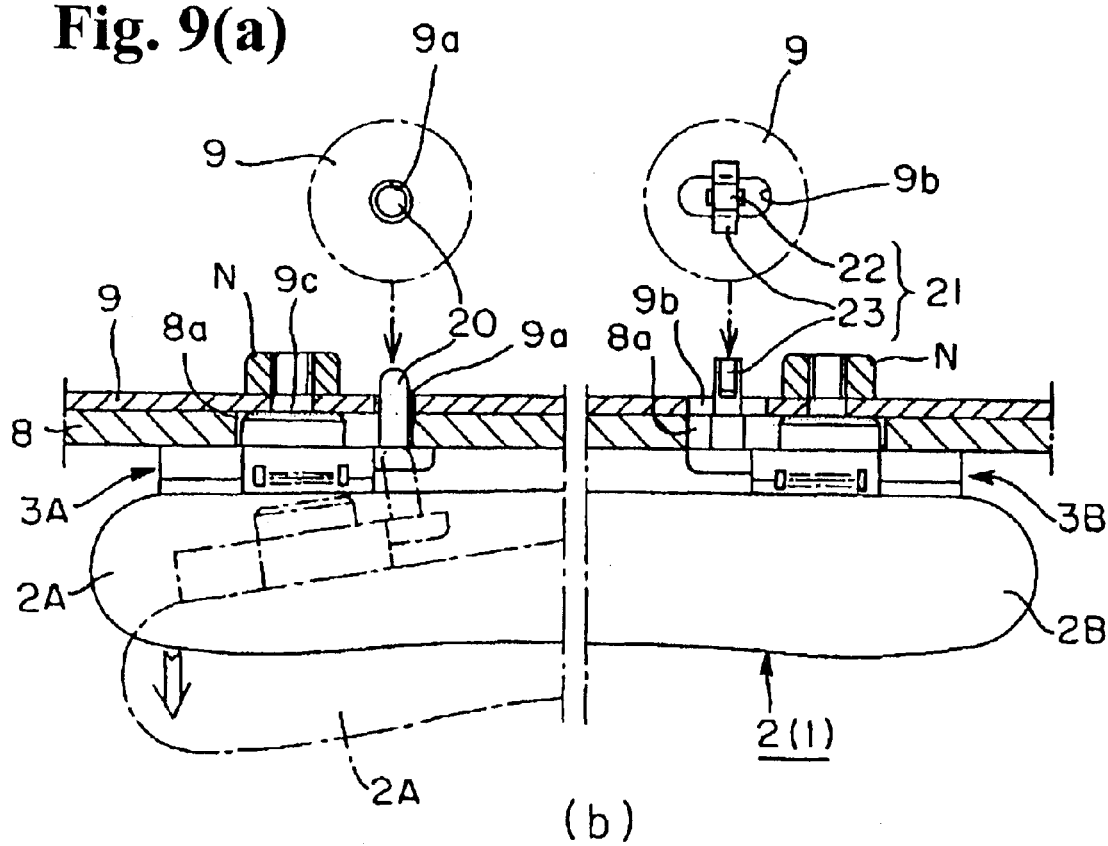
FIGS. 9(a) and 9(b) are sectional views showing an operation of removing the assist grip.
Figure 9B:
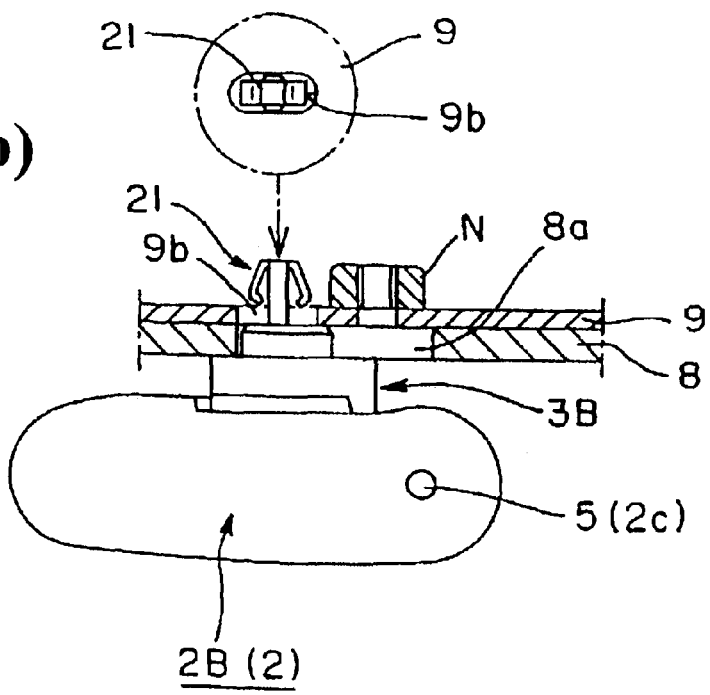

FIGS. 6(a)–6(c) are views showing a detailed structure of the other end of the assist grip, wherein FIG. 6(a) is a view showing the supporting member in an open state of the cover portion, FIG. 6(b) is a view showing a relation between the main portion of the assist grip and the supporting member, and FIG. 6(c) is a view showing a state that the supporting member is installed to the main portion of the assist grip. FIG. 7 is a perspective view showing an operation of temporary attaching of the assist grip, and FIG. 8 is a perspective view showing an operation of permanent attaching of the assist grip. FIGS. 9(a) and 9(b) are views showing an operation of removal of the assist grip from the attaching portion of the vehicle, wherein FIG. 9(a) shows a process of releasing the permanent attaching member and disengaging the temporary attaching of the one end of the supporting member, and FIG. 9(b) shows a state that the assist grip is rotated by about 90 degrees around the temporary attaching of the other side of the supporting member.

According to an embodiment of the invention, an assist grip 1 includes a grip main portion 2 to be held by a hand, supporting members 3A and 3B to be assembled in the grip main portion 2 through shafts 4 and 5 as axes, a damper device 6, and an urging spring 7. A grip main portion 2 has substantially a U-shape with both ends folded. The supporting members 3A and 3B corresponding to both ends 2A and 2B are attached to the grip main portion to be rotatable around the shafts 4 and 5. Also, after attaching temporarily to a panel 9 disposed on a backside of an interior wall 8 through the supporting members 3A and 3B at both sides, the grip main portion 2 is attached by screws or bolts 10 as permanent attaching members. The grip main portion 2 rotates to switch between a non-operational position retracted along the interior wall 8 as shown in FIG. 4(a), and an operational position protruding into the vehicle as shown in FIG. 4(b). The grip has the above-mentioned functions same as those of a conventional grip. The embodiment of the invention is unique in a structure of the supporting members 3A and 3B, a temporary attaching structure, and related features to these structures. Hereafter, main portions of the structures and features will be explained in detail.

Incidentally, both the grip main portion 2 and the supporting members 3A and 3B are formed of a resin, but can be formed of other materials. The panel 9 corresponds to the attaching portion of the invention. However, the interior wall 8 may be the attaching portion of the vehicle. Also, a partitioning wall for dividing a room or a rear wall of a seat can be the attaching portion. FIG. 7 and FIG. 8 show only a panel 9 for convenience.

The grip main portion 2 has a holding portion at a middle portion of the U-shape body, and a connecting portion for connecting to the supporting members 3A and 3B at both ends 2A and 2B of the U-shape body. The end portions 2A and 2B have the same features in which recessed portions 2a and 2b are formed for receiving the supporting members 3A and 3B at rear sides, and attaching holes 2c and 2d are provided at right and left sides. The attaching holes 2c pass through from outside to the recessed portion 2a and 2b, and the attaching holes 2d are provided on the sides of the recessed portion 2a and 2b as recessed spots. In the recessed portion 2b, an engagement groove 2e is provided on an edge surface for engaging one end 7a of an urging spring 7, as shown in FIGS. 6(b) and 6(c).

The supporting members 3A and 3B include the following common features. The supporting members rotatably support the end portions 2A and 2B of the grip main portion 2 through the shafts 4 and 5. The supporting members are connecting members to attach the grip main portion 2 to the panel 9 temporarily or permanently. The damper device 6 for damping is disposed on a side of the supporting member 3A. The urging spring 7 is disposed on a side of the supporting member 3B. Incidentally, due to the similarity of the shapes of the supporting members 3A and 3B in the embodiment, substantially the same features are described as the supporting member 3, and only when describing different features, they are described as the supporting member 3A and the supporting member 3B.

As shown in FIGS. 5(a)–5(c) and FIGS. 6(a)–6(c), the supporting member 3 is integrally formed of a base portion 11 for installation, a cover portion 13 connected to the base portion 11 through a thin-wall hinge 12, an engagement device 14 for engaging the cover portion 13 to the base portion 11, and a connecting portion 15 for connecting to a side of the grip main portion 2. Also, a pole protrusion 20 for temporary attaching is provided in the supporting member 3A, and an elastic protrusion 21 for temporary attaching is provided in the supporting member 3B.

Here, the base portion 11 is an L shape member generally formed of a horizontal plate 11a and a vertical plate 11b. A blade portion 11c is provided in front sides of the horizontal plate ha and the vertical plate 11b for storing a bead portion 10b of a bolt 10. The blade portion 11c protrudes with a gate shape or a U-shape to keep a predetermined step from a front peripheral so that the cover portion 13 closes smoothly. An engagement hole 16 is provided in the horizontal plate 11a. The engagement hole 16 is located at a middle of the horizontal plate 11a, opens to a rear side, and forms the engagement device 14 along with an engaging piece 17, which will be described later. A through hole 18 is provided at a middle of the vertical plate 11b through front to back. A plate portion 19 extends outside at one side of the vertical plate 11b. The plate portion 19 is flush with a rear surface of the vertical plate 11b.

The pole protrusion 20 projects at the rear side of the plate portion 19 on a side of the supporting member 3A. The elastic protrusion 21 projects at the rear side of the plate portion 19 on a side of the supporting member 3B. The pole protrusion 20 has a column shape with a rounded small tip. With reference to FIG. 7, the pole protrusion 20 can be freely inserted into and pulled out from the temporary attaching hole 9a corresponding to the panel 9. The shape may be a square pole or a semicircular pole, etc. In those cases, the temporary attaching hole 9a does not need to be a round hole such as the embodiment, and may be a shape for freely inserting and extracting the square pole or semicircular pole. That is, a hole shape is same as a section shape of the square pole or semicircular pole. The elastic protrusion 21 has almost an anchor shape with engagement pawls 23 that deform elastically to both sides of the supporting pole 22.

With reference to FIG. 7, the engagement pawls 23 pass through the temporary attaching hole 9b corresponding to the panel 9 as elastically deforming by a predetermined pressing force. The engagement pawls 23 restore the original shape once passing through the hole, and become incapable of being extracted. In addition, when the grip main portion 2 is rotated by a predetermined angle (approximately 90 degrees in the embodiment example) in the state that the pole protrusion 20 is pulled out, from the temporary attaching hole 9a, the engagement pawls 23 can be extracted easily from the temporary attaching hole 9b. Therefore, the temporary attaching hole 9b has the shape dissimilar to the shape of the engagement pawls 23 seen from the front of the elastic protrusion 21. That is, as shown in FIG. 9(b), the temporary attaching hole 9b has a rectangular or similar shape seen from the front.

The cover portion 13 is integrated with an upper edge of the vertical plate 11b through the thin-wall hinge 12. In an open state, the cover portion 13 has an approximately U-shape section, and includes an engagement piece 17 provided at a front side with a pawl that elastically engages the engagement hole 16, a step 13a provided at a base of the engagement piece 17, and small slits 13b provided on both sides of the thin-wall hinge 12. When the cover portion 13 is rotated in a closing direction around the thin-wall hinge 12, the engagement piece 17 engages the engagement hole 16 to lock the cover portion 13 in a closing state. The step 13a is used when the cover portion 13 is switched from the closing state to the opening state. That is, in the closing state, when, for example, a tool or a nail is inserted into the step 13a to push toward an opening direction, the engagement piece 17 in the engagement hole 16 is released and the cover portion 13 is ready to open. The small slits 13b are provided on a boundary portion between the cover portion 13 and the vertical plate 11b, and help the thin-wall hinge 12 to swing smoothly. In the cover portion 13 shown in FIG. 5(a), FIG. 6(a), and FIG. 8, the supporting member 3A is shown in a state rotated around the thin-wall hinge 12 by an angle smaller than that of the supporting member 3B for easy drawing.

The connecting portions 15 are provided under both sides of the horizontal plate 11a, and each of the connecting portions 15 has an almost semicircular shape. Both of the connecting portions 15 include axial holes 15a provided on the same axis. Also, at a side of the supporting member 3A, an engagement groove 15b is provided inside the connecting portion 15, as shown on the left side of FIG. 5(a). The engagement groove 15b extends from a front side of the connecting portion 15 to a rear side through the axial hole 15a, and engages a recessed portion 6c of a damper device 6c, which will be described later. Further, at a side of the supporting member 3B, the control groove 15c is provided between the connecting portion 15, as shown in the left side of the FIG. 1(b), and the engagement hole 16 for engaging the other end 7b of the urging spring 7, as shown in FIG. 1(b).

Next, an assembling of the supporting member 3 to the grip main portion 2 will be explained. The supporting member 3A is attached to the recessed portion 2a of the end portion 2A with the damper device 6 through the shaft 4. In the damper device 6, an outer cylinder 6a as a main body has a cavity provided in a wall for holding an oil inside. The damper device 6 also includes an inner cylinder 6b attached to one end of the outer cylinder 6a and partially fitting to the cavity, and a protrusion portion 6c protruded at an outside surface of the inner cylinder 6b. Both of the cylinders 6a and 6b rotate relative to each other while receiving resistance of the oil filled in the cavity portion. As shown in FIG. 5(a), the damper device 6 is pushed toward the supporting member 3A between both of the connecting portions 15 while the protrusion portion 6c is fitted to the engagement groove 15b, thereby assembling as shown in FIG. 5(b)

Then, the supporting member 3A is positioned on the end portion 2A, and is connected through the shaft 4. In the assembly process, from a state where the supporting member 3A is located in the recessed portion 2a, the shaft 4 is pushed through the attaching hole 2c of the end portion 2A at one side, the axial hole 15a at one side, calibers of the outside cylinder 6a and the inside cylinder 6b, the axial hole 15a at the other side, and the attaching hole 2d at the other side, as shown in FIG. 5(b). In the assembled state, one end 4a of the shaft 4 is fixed to the attaching hole 2c of the end portion 2A, while the shaft 4 is free from the caliber of the inside cylinder 6b and contacts the caliber of the outside cylinder 6a. The connecting portions 15, lower parts of the supporting member 3A, are located inside the recessed portion 2a, to thereby be rotatable around the shaft 4 between the operational state shown in FIG. 7 and the non-operational state shown in FIG. 5(c). During the rotation, the supporting member 3A is under the damping or a predetermined resistance of the damper device 6.

The supporting member 3B is attached to the recessed portion 2b of the edge portion 2B with the urging spring 7 through the shaft 5. The supporting member 3B is disposed in the recessed portion 2b. A shaft 5 is pushed through the attaching hole 2c of the edge portion 2B at one side, the axial hole 15a at one side, the urging spring 7, the axial hole 15a at the other side, and the attaching hole 2d at the other side. The urging spring 7 is held around the shaft 5, and one end 7a of the urging spring 7 engages the engagement groove 2e. The other end 7b engages the control groove 15c, thereby producing an urging force. In the assembled state, one end 5a of the shaft 5 is fixed to the attaching hole 2c. The grip main portion 2 rotates toward a direction to be fitted in the recessed portion 2b (the non-operational position of the grip main portion 2) with the urging force of the urging spring 7, as shown in FIG. 6(c).

The assist grip 1 is positioned and attached temporarily on the panel 9 through the supporting members 3A and 3B. Then, the assist grip 1 is fixed with a predetermined strength by the bolt 10. Next, processes of the temporary attaching, the permanent attaching, and the removal of the assist grip 1 are described. Note that two attaching holes 9c are provided on the panel 9 along with the temporary attaching holes 9a and 9b. Each of the attaching holes 9c communicates with a female screw of a nut N installed on the rear surface of the panel 9, as shown in FIGS. 9(a) and 9(b). The bolt 10 is screwed in the nut N. However, the attaching hole 9c itself can be formed as a screw hole. Also, openings 8a are provided in the interior wall 8 for receiving the corresponding portions of the supporting members 3A and 3B (a cylindrical boss portion projected into the rear surface of the vertical plate 11b around the through hole 18, and a reinforcement rib bridging between the boss portion and the pole protrusion 20, or the boss portion and the elastic protrusion 21), as shown in FIG. 9(a).

In the temporary attaching of the assist grip 1, as shown in FIG. 7, the pole protrusion 20 of the supporting member 3A and the elastic protrusion 21 of the supporting member 3B are pressed into the temporary attaching holes 9a and 9b. As shown in FIG. 9(a), the pole protrusion 20 easily engages the temporary attaching hole 9a. The engagement pawls 23 are deformed while the elastic protrusion 21 is passing through the temporary attaching hole 9b. Once the elastic protrusion 21 passes through, the engagement pawls 23 are returned to the original shape, thereby not to be extracted. Thus, this structure allows the assist grip 1 to be attached temporarily by a simple operation of pressing the assist grip 1 to the panel 9 from the front. Once the assist grip 1 is attached temporarily, the assist grip 1 does not come out unexpectedly by a large vibration due to the engagement between the elastic protrusion 21 and the temporary attaching hole 9b.

FIG. 7 shows that the assist grip is attached in a state that the supporting members 3A and 3B are rotated away from inside the recessed portions 2a and 2b (the operational position of the grip main portion 2). However, in an actual case, the assist grip is attached temporarily in a state that the supporting members 3A and 3B are placed in the recessed portions 2a and 2b (the non-operational position of the grip main portion 2), as shown in FIG. 5(c) and FIG. 6(c). Alternatively, the assist grip may be attached temporarily in a state that the cover portions 13 of the supporting members 3A and 3B are further opened from the state shown in FIG. 8 to a state that edges of the cover portions 13 abut against front edges of the recessed portions 2a and 2b. In this case, it is possible to eliminate a step of opening the cover portions 13 for the next step, or the permanent attaching operation.

When the assist grip 1 is attached permanently with the bolt 10, the cover portions 13 are opened as shown in FIG. 8 if the cover portions 13 are closed. An operator switches the grip main portion 2 to the operational position against the urging force of the urging spring 7 as shown in FIG. 8. In that state, the operator tightens the male screw parts 10a of the bolts 10 to the attaching holes 9c and the nuts N through the through holes 18 of the supporting members 3A and 3B. After that, each of the cover member portions 13 of the supporting members 3A and 3B is closed. FIG. 3 shows a state that the assist grip 1 is attached to the panel 9 through the interior wall 8 as described above. The grip main portion 2 is rotated to be in the non-operational position by the urging force of the urging spring 7 when the grip main portion 2 is not used. When an occupant uses the assist grip, the assist grip is rotated to switch from the non-operational position to the operational position indicated by a projected line. A rotational range is defined from a solid line in FIG. 3 to a point where the lower edges of the recessed portions 2a and 2b of the edge parts 2A and 2B abut against the horizontal plate 11a, set to be between 80 degrees to 120 degrees.

In the operational position of the grip main portion 2 as shown in FIG. 4(b), the supporting members 3A and 3B are largely exposed to the inside of the compartment of the automobile. However, because the supporting members 3A and 3B are covered with the cover portion 13 and the head portion 10b of the bolt 10 is covered with the cover portion 13, unlike the conventional grip, the structure of the invention does not give an unpleasant feeling or spoil comfort, thereby improving the quality. Also, when the grip main portion 2 in the operational position is released from a hand, the grip main portion 2 is automatically returned to the non-operational position by the urging force of the urging spring 7 with a speed damped by the damper device 6.

When removing the assist grip 1 from the panel 9 to collect, the cover portions 13 are opened using the steps 13a, and the bolts 10 in the supporting members 3A and 3B are removed. FIG. 9(a) shows a state where each of the bolts 10 is removed. An operator pulls out the supporting member 3A, or the end portion 2A, in an arrow direction from the state in FIG. 9(a) to detach the pole protrusion 20 from the temporary attaching hole 9a of the panel 9. Then, the end portion 2A is rotated downwardly by approximately 90 degrees around the elastic protrusion 21. FIG. 9(b) shows a view showing a state after the rotation seen from the top. In this state, it is possible to move the elastic protrusion 21 relative to the temporary attaching hole 9b, thereby easily pulling out from the temporary attaching hole 9b without restriction of the long part of the temporary attaching hole 9b. Thus, in this structure, it is possible to remove the assist grip simply by removing the bolt 10 without using other tools.

Figure 10A:
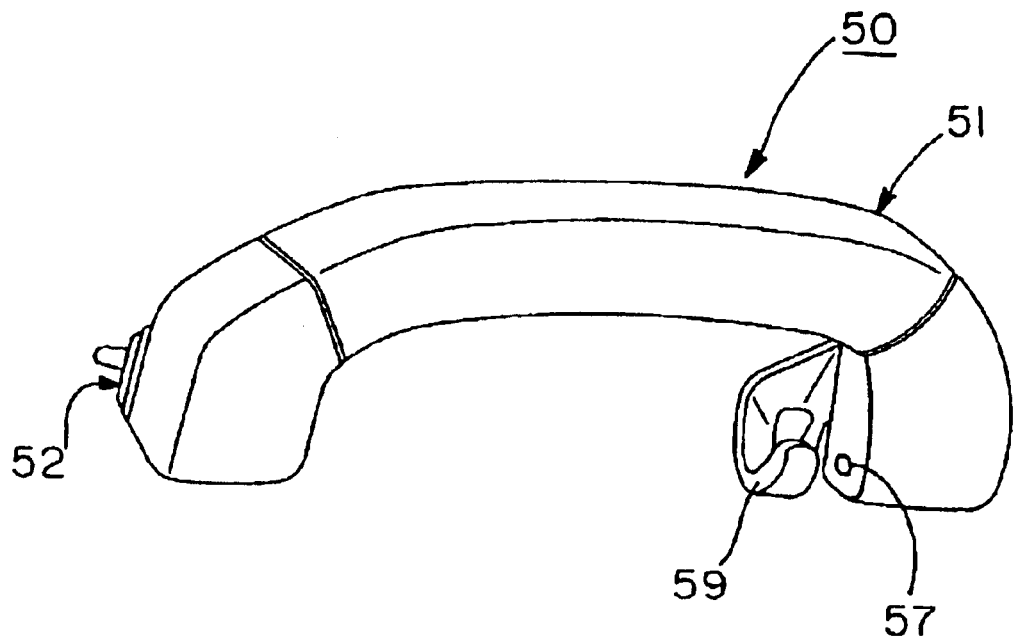
FIGS. 10(a) and 10(b) are perspective views showing a conventional assist grip.
Figure 10B:
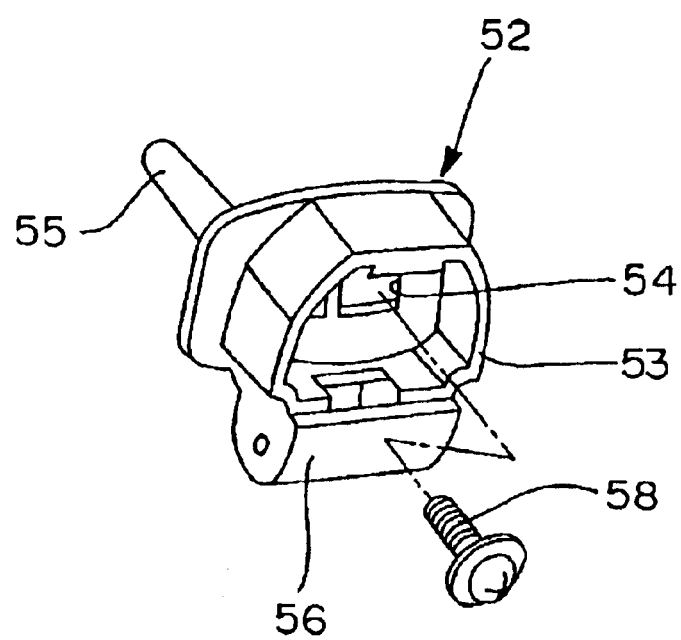

Incidentally, the invention is not limited to any of the embodiments. For example, the shapes of the temporary attaching hole 9a and the pole protrusion 20 may be changed. The bolt 10 may be a screw. The attaching holes 9c may be a screw hole. The cover portion 13 may be formed in a different shape. Further, a hook may be provided as needed as shown in the conventional grip in FIG. 10.

As described above, the assist grip according to the present invention achieves the following advantages. In the assembly line of the interior of the vehicle, it is possible to reduce a manufacturing cost and maintain the operability of temporary attaching to the attaching portion in the compartment without having an unexpected detachment. Also, the assist grip can be easily removed during the recovery upon scrapping the vehicle. Since the supporting members are integrally formed of the cover portions and the engagement devices, it is possible to improve the appearance and the commercial value without increasing the number of parts.

While the invention has been explained with reference to the specific embodiments of the invention, the explanation is illustrative and the invention is limited only to the appended claims.

What is claimed is:

1. An assist grip to be attached to an interior wall having a first temporary attaching hole and a second temporary attaching hole in a vehicle, comprising:

a main body having two end portions, supporting members attached to the two end portions of the main body for rotatably supporting the main body, one pole protrusion disposed on one of the supporting members to freely enter the first temporary attaching hole so that when the one pole protrusion is inserted into the first temporary attaching hole, the main body can rotate around the one pole protrusion, one elastic protrusion disposed on the other of the supporting members to be inserted into the second temporary attaching hole, said elastic protrusion having a structure such that when the elastic protrusion is inserted into the second temporary attaching hole while the one pole protrusion is inserted into the first temporary attaching hole, the elastic protrusion engages the second temporary attaching hole to immovably fix the main body to the interior wall, and when the one pole protrusion is pulled out from the first temporary attaching hole, the main body can be rotated around the one elastic protrusion to allow the elastic protrusion to be released from the second temporary attaching hole, thereby allowing the assist grip to be detached from the interior wall, and means for permanently attaching the supporting members to the interior wall.

2. An assist grip according to claim 1, wherein said pole protrusion has a column or polygonal pillar shape and a cross section similar to that of the first temporary attaching hole, and said elastic protrusion has an anchor shape with engagement pawls on two sides at an end thereof, said anchor shape being non-similar to the second temporary attaching hole in a condition that the elastic protrusion is inserted into the second temporary attaching hole.

3. An assist grip according to claim 1, wherein said means for permanently attaching the supporting members includes a hole formed in each of said supporting members adjacent to each of the protrusions for receiving a permanent fixing device for fixing the supporting members to the interior wall.

4. An assist grip according to claim 1, wherein said one pole protrusion and said one elastic protrusion are only protrusions for temporarily attaching the assist grip to the interior wall.

5. A combination comprising the assist grip and the interior wall according to claim 1, wherein said second temporary attaching hole has an elongated shape so that the elastic protrusion can engage an edge of the second temporary attaching hole in one position and can pass through the second temporary attaching hole in another position.

6. An assist grip according to claim 1, wherein each of said supporting members is integrally formed of a base portion having a through hole for the permanently attaching means and the pole protrusion or the elastic protrusion for a temporary attachment of the assist grip, a hinge, a cover portion connected to the base portion through the hinge for opening and closing the base portion, an engagement device for engaging the cover portion with the base portion, and a connecting portion for connecting the supporting member to the main body.

7. An assist grip according to claim 6, wherein said pole protrusion or elastic protrusion is disposed on a plate of the base portion to project outwardly therefrom, and said engagement device includes an engagement piece provided in the cover portion and an engagement hole provided in the base portion.

8. An assist grip according to claim 7, wherein said main body has concaves at the two end portions in which said supporting members are disposed.

* * * * *